United States Patent

Shannon

[15] 3,662,977
[45] May 16, 1972

[54] AIRCRAFT TAXI GUIDANCE SYSTEM

[72] Inventor: James A. Shannon, 2923 Q Street, N.W., Washington, D.C. 20007

[22] Filed: May 7, 1969

[21] Appl. No.: 822,472

[52] U.S. Cl. ............................244/114 R, 180/79.1, 340/26
[51] Int. Cl. ..........................................................B64f 1/00
[58] Field of Search ..................244/114, 50; 340/26, 27, 29, 340/30; 180/98, 79, 79.1; 318/310

[56] References Cited

UNITED STATES PATENTS

| R25,666 | 10/1964 | Gunn | 340/26 |
| 1,968,068 | 7/1934 | Blancard et al. | 340/26 UX |
| 2,044,852 | 6/1936 | Kramar | 340/26 |
| 2,574,490 | 11/1951 | Lawrence | 340/26 |
| 3,132,710 | 5/1964 | Petrella et al. | 180/98 UX |
| 3,431,996 | 3/1969 | Giles et al. | 180/98 |

FOREIGN PATENTS OR APPLICATIONS

| 1,041,805 | 10/1958 | Germany | 244/114 |
| 1,129,383 | 9/1960 | Germany | 244/114 |
| 635,999 | 3/1962 | Italy | 244/114 |
| 183,317 | 7/1922 | Great Britain | 244/114 |

*Primary Examiner*—Milton Buchler
*Assistant Examiner*—Paul E. Sauberer
*Attorney*—Jacob Trachtman

[57] ABSTRACT

An aircraft taxi guidance system in which a controlled magnetic field is set up along the runway-taxiway and a dip needle in the aircraft takes up an equilibrium position which depends on the distance and direction of the aircraft from the center of the runway. When the aircraft is at the center of the runway the dip needle points straight up. When the aircraft is off from the center of the runway, the dip needle will be inclined from vertical at an angle depending on the distance from the center of the runway. Thus, the position of the dip needle indicates the position of the aircraft with respect to the center of the runway.

1 Claim, 2 Drawing Figures

Patented May 16, 1972

3,662,977

INVENTOR
JAMES A. SHANNON
BY Jacob Trachtman
ATTORNEY

AIRCRAFT TAXI GUIDANCE SYSTEM

The present invention relates to an aircraft taxi guidance system, and more particularly to a guidance system for indicating the position of an aircraft which is taxiing along a runway with respect to the center of the runway.

When an aircraft is taxiing along a runway of an airfield it is desirable to maintain the aircraft along the center of the runway to prevent any possibility of an accident. Generally the position of the aircraft on the runway is maintained by a visual sighting by the pilot of the aircraft. However, under certain weather conditions the maintenance of the proper position of the aircraft on the runway by a visual sighting becomes extremely difficult if not impossible. Therefore, it would be desirable to have an instrument system for the proper guidance of the aircraft along the runway.

It is therefore an object of the present invention to provide an aircraft taxi guidance system.

It is another object of the present invention to provide a guidance system for an aircraft which is taxiing along a runway which indicates the position of the aircraft with respect to the center of the runway.

It is a further object of the present invention to provide an aircraft taxi guidance system which is suitable for use on a runway which extends in any direction and for an aircraft which is taxiing in either direction on the runway.

It is a still further object of the present invention to provide an aircraft taxi guidance system which does not interfere with the other instruments of the aircraft.

These objects are achieved by a guidance system which includes a pair of spaced, parallel conductors which extend parallel to the center of the runway and which are connected in a loop circuit to a source of D.C. current. This creates a pair of magnetic fields which are in aiding relation at the center of the runway. A dip needle carried on the aircraft is controlled as to its position by the magnetic fields. When the aircraft is at the center of the runway, the dip needle points straight up. As the aircraft moves from the center of the runway, the dip needle tilts from the straight up position. The angle of the tilt indicates the distance of the aircraft from the center of the runway, and the direction of the tilt indicates which side of the center the aircraft is located.

For the purpose of illustrating the invention there is shown in the drawings a form which is presently preferred; it being understood, however, that this invention is not limited to the precise arrangements and instrumentalities shown.

Figure 1:
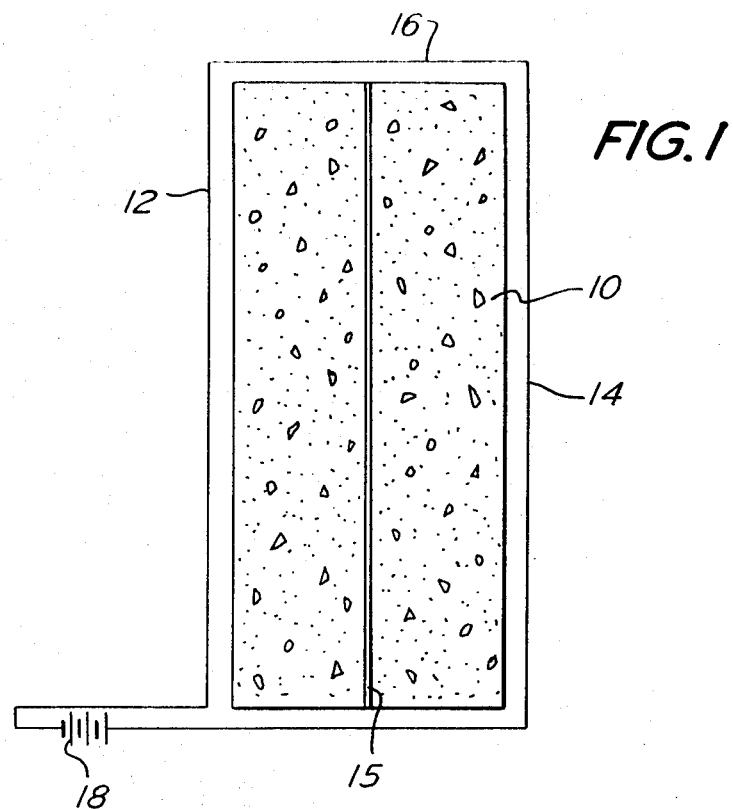
FIG. 1 is a schematic diagram of a runway having the guidance system of the present invention.
Figure 2:
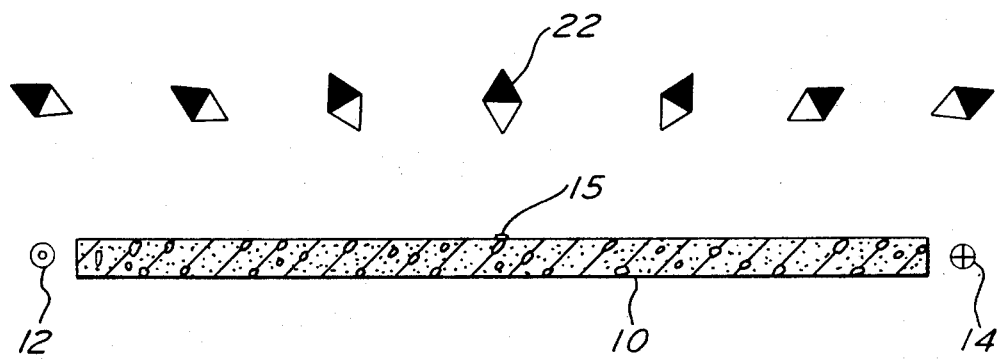
FIG. 2 is a schematic diagram showing the positions of the dip needle at various positions of the aircraft on the runway.

Referring to FIG. 1, there is shown a runway 10 which is generally an elongated strip of concrete or similar paving material. The aircraft taxi guidance system of the present invention includes a pair of parallel conductors 12 and 14, which are wires or cables, extending along opposite sides of and parallel to the center of the runway 10. At one end of the runway 10, the conductors 12 and 14 are connected by a conductor 16. At the other end of the runway 10, the conductors 12 and 14 are connected across a source 18 of D.C. current. The conductors 12, 14 and 16 may be either on the surface of the ground or may be buried slightly below the surface of the ground. A dip needle, indicated as 22 in FIG. 2, is mounted on the aircraft. The dip needle 22 is similar to the needle of a compass. The dip needle is mounted to rotate in a plane perpendicular to the ground about an axis which is parallel to the ground. If, for reasons which will be explained later, the dip needle 22 is not mounted on the instrument panel in the cockpit of the aircraft, it can be connected by a suitable servo-mechanism to an instrument on the instrument panel which indicates the position of the dip needle.

Consider first an idealized case where the runway 10 extends in a magnetic north-south direction and the conductors 12 and 14 are equally spaced from the center line 15 of the runway. With no current passing through the conductors 12 and 14, the dip needle 22 will point straight downwardly for a runway located in the northern magnetic hemisphere. When a current is passed through the conductors 12 and 14, an artificial magnetic field is created around each of the conductors, which magnetic fields will overlap each other over the runway 10. Since the current passes through the conductor 12 in one direction along the runway 10 and through the conductor 14 in the opposite direction along the runway, the magnetic fields flow in opposite directions around the conductors 12 and 14. Thus, the magnetic fields are in aiding relation where they overlap over the runway 10 and have the strongest effect at the center of the runway. If the current is sufficiently strong so that the force of the artificially created magnetic fields at the center of the runway 10 overcomes the earth's natural magnetic field, the dip needle 22 will point straight up at the center of the runway as shown in FIG. 2. If the conductors 12 and 14 are spaced apart 60 feet, a minimum current of 1,125 amperes is sufficient to overcome the earth's natural magnetic field of 50,000 gamma (1 gamma = $10^{-9}$ webers/m$^2$).

As shown in FIG. 2, if the aircraft deviates from the center line 15 of the runway 10, for example toward the conductor 14, the force of the magnetic field around the conductor 14 will be greater than that around the conductor 12 so that the dip needle 22 will tilt toward the conductor 14. The closer that the aircraft moves toward the conductor 14, the more the dip needle 22 will tilt toward the conductor 14. Likewise, if the aircraft deviates from the center line 15 of the runway 10 toward the conductor 12, the dip needle 22 will tilt toward the conductor 12. Thus, the angle of the dip needle with respect to the vertical indicates the position of the aircraft with respect to the center line 15 of the runway, and the direction of any tilt of the dip needle indicates which side of the center line 15 of the runway the aircraft has deviated.

However, if the runway extends in a direction other than north-south, such as east-west, the earth's natural magnetic field has a horizontal component in a plane perpendicular to the runway center line 15. This destroys the symmetry previously described so that the center line between the conductors 12 and 14 is no longer the point where the dip needle 22 points straight up. Therefore, if the conductors 12 and 14 are uniformly spaced from the center line 15 of the runway 10, the dip needle 22 will not point straight up at the center line. This is overcome by adjusting the position of the conductors 12 and 14 with respect to the center line 15 of the runway 10 so that the dip needle 22 does point straight up at the center line of the runway. Thus, no matter which direction the runway extends the conductors 12 and 14 can be positioned along the length of the runway to provide a magnetic field around each conductor which will cause the dip needle to point straight up at the center of the runway and will indicate the position of the aircraft with respect to the center of the runway.

Most airfields include a number of runways extending in different directions over which the aircraft must taxi from the terminal to take-off or from the landing point to the terminal. Such an airfield can have a separate set of conductors for each section of the runways with the position of the conductors and the magnitude of the current being suitable for the particular direction of the section of the runway. This includes the turning sections of the runway.

Since the dip needle is operated by a magnetic field, it should be mounted on the aircraft away from any magnetic material. Also, it should not be mounted too far off of the ground. Therefore, for large aircraft it may be necessary to mount the dip needle below the fuselage. In such case, the dip needle can be connected by a servo-mechanism to an indicator in the cabin of the aircraft. The guidance system of the present invention does not interfere with any of the guidance systems of the aircraft except the magnetic compass. However, since the artificial magnetic field is at ground level, once the aircraft is airborne or while it is landing, the magnetic compass is not affected. Since the artificial magnetic field causes the dip needle to point in the direction opposite to that which it would point under the influence of the earth's natural field, the pilot can easily determine when the guidance system is operating.

The present invention may be embodied in other specific forms without departing from the spirit or essential attributes thereof and, accordingly, reference should be made to the appended claims, rather than to the foregoing specification as indicating the scope of the invention.

What is claimed is:

1. A system for guiding an aircraft which is taxiing along a longitudinal extending runway having opposite sides and a longitudinal center line including means comprising a pair of spaced substantially linear and parallel conductors extending along opposite sides of the runway providing a pair of static magnetic fields which overlap the runway and are in aiding relation to provide a resultant field with a vertical direction along the center line of the runway, said parallel conductors being unequally spaced from said center line to counterbalance any horizontal component in the earth's magnetic field which is perpendicular to said center line to provide a total resultant field with the earth's magnetic field having a substantially negligible horizontal component perpendicular to the center line, means for passing a direct current passing through one of said conductors in one direction along the runway and passing through the other conductor in the other direction along the runway, the magnitude of the current passing through the conductors being sufficient to create a total magnetic force along the center line of said runway which is greater than and is substantially opposite to that of the earth's natural magnetic field, and means carried by the aircraft which when subject to the magnetic fields indicates the position of the aircraft with regard to the center line of the runway and which when subject only to the earth's natural field indicates the absence of the fields produced by said currents through said conductors, whereby said last means provides an indication of when the system is inoperative, said means carried by the aircraft for indicating the position of the aircraft comprises a dip needle which when subjected to the magnetic fields assumes a position which indicates the position of the aircraft with regard to the center of the runway, said needle being mounted in means carried by the aircraft to rotate in a plane which is perpendicular to the ground and about an axis which is parallel to the center line of the runway, said conductors being electrically connected together at one end and are connected to the means for providing the direct current at their other ends so as to form a loop circuit through which the current passes.

* * * * *